United States Patent [19]

Bradley

[11] Patent Number: 4,932,689
[45] Date of Patent: Jun. 12, 1990

[54] HOSE FITTING ASSEMBLY

[75] Inventor: David W. Bradley, Westfield, Mass.

[73] Assignee: Teleflex Incorporated, Limerick, Pa.

[21] Appl. No.: 387,332

[22] Filed: Jul. 28, 1989

[51] Int. Cl.⁵ .................................. F16L 33/00
[52] U.S. Cl. ........................... 285/255; 285/323; 285/423
[58] Field of Search ............... 285/255, 323, 249, 423

[56] References Cited

U.S. PATENT DOCUMENTS

| 3,980,325 | 9/1972 | Roberton | 285/249 |
|---|---|---|---|
| 4,705,304 | 11/1987 | Matsuda | 285/255 X |
| 4,712,813 | 12/1987 | Passerell et al. | 285/323 |

FOREIGN PATENT DOCUMENTS

| 2408892 | 9/1975 | Fed. Rep. of Germany | 285/255 |
|---|---|---|---|
| 13056 | 4/1971 | Japan | 285/255 |

*Primary Examiner*—Dave W. Arola
*Attorney, Agent, or Firm*—Reising, Ethington, Barnard, Perry & Milton

[57] ABSTRACT

A hose coupling assembly (10) of the type adapted to secure a hose (12) to a fitting. The assembly (10) includes a hose (12). A coupling member (16) is provided which includes an insert portion (18) for disposition within an opening (14) in the hose (12). An inner collar (28) is positioned about the exterior of the hose (12) and radially spaced from the insert portion (18) of the coupling member (16). An outer collar (38) is positioned over the inner collar (28) to provide an inwardly directed force thereto. The inner collar (28) has a plurality of slots (34) therein. The slots (34) compress in response to the inwardly directed force from the outer collar (38) to reduce the inner diameter of the inner collar (28) to thereby provide radial compression completely about the hose (12). The compression prevents removal of the coupling member (16) from the hose (12).

6 Claims, 2 Drawing Sheets 4,932,689

HOSE FITTING ASSEMBLY

TECHNICAL FIELD

The present invention relates to a conduit coupling assembly. More specifically, the present invention relates to a nonmetallic conduit end fitting which is adapted for connecting the conduit with a mating fitting.

BACKGROUND ART

In many instances, it is desirable to secure a nonmetallic fitting to a conduit or hose to secure the hose to another mating fitting. Chemically unreactive nonmetallic fittings are particularly desirable when the hose is to be used in a corrosive environment. Furthermore, nonmetallic hose fittings are cheaper and lighter in weight than conventional metallic hose fittings. In order to produce a fluid tight hose fitting made of a nonmetallic material, it is necessary to provide a fitting which applies constant radial compression about the entire conduit when installed.

The U.S. Pat. No. 4,281,862 to Ridenour discloses another hose fitting assembly. This assembly includes a coupling member for insertion partially within a hose with a plurality of raised ridges thereon to engage the interior of the conduit. A metallic sleeve is disposed about the hose and is disposed over and radially spaced from the portion of the coupling member inserted into the hose. Once the metal sleeve is positioned, a pair of dies engage the sleeve and force the sleeve to engage the conduit to permanently deform the sleeve such that the conduit and sleeve engage the areas between the raised ridges of the inserted portion. The sleeve is, therefore, permanently deformed to prevent removal of the sleeve and the inserted portion from the conduit.

The U.S. Pat. No. 4,519,637 to Folkers issued May 28, 1985 discloses a pipe coupling assembly. This assembly includes a member which is inserted into a conduit and an outer metallic sleeve, which has an axial slit along the entire length of the sleeve, is positioned about the exterior of the conduit. The sleeve has a plurality of teeth on the inner surface thereof for engaging the conduit. An outer collar threadedly engages the inner sleeve and provides an inward force to radially compress the inner sleeve only at the slit; that is, radial compression is not uniform about the entire conduit, and some points about the sleeve are not radially compressed.

SUMMARY OF THE INVENTION AND ADVANTAGES

According to the present invention, there is provided a coupling assembly of the type for connecting a conduit with a fitting. The assembly comprises coupling means adapted for disposition partially within the conduit. The coupling means is also adapted for connection to the fitting. The assembly further includes outer collar means adapted for disposition about the conduit to provide a radially inwardly directed force. The assembly is characterized by annular inner collar means adapted for disposition between the conduit and the outer collar means. The annular inner collar means radially compresses to cause the conduit to engage the coupling means in response to the inwardly directed force from the outer collar means such that the inner collar means provides radial compression circumferentially about the conduit.

Accordingly, there is provided a light weight hose fitting which provides constant radial compression about the entire circumference of the conduit. By utilizing a fitting of this type, the fitting can be made from a nonmetallic material.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
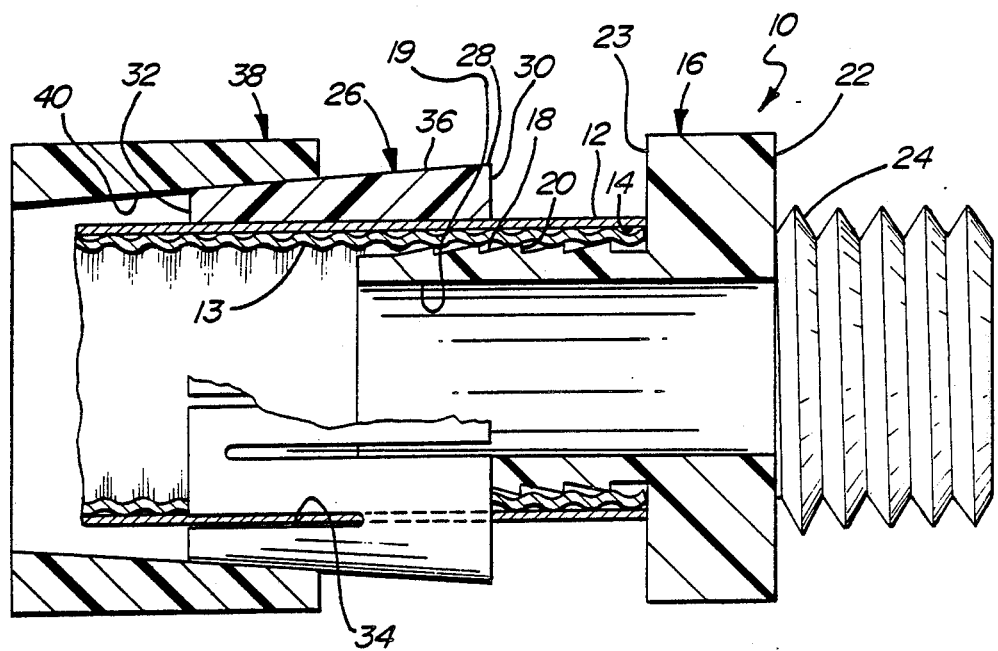
FIG. 1 is a side view partially in cross section view showing the assembly in the preassembled position.
Figure 3:
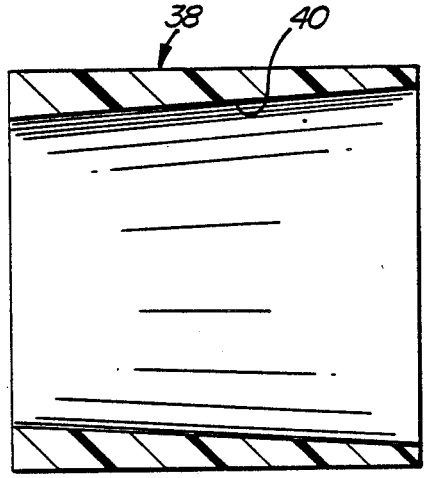
FIG. 3 is a cross sectional view of the outer collar.

A conduit coupling assembly of the type for connecting a conduit with a fitting is generally shown at 10 in the Figures. The assembly 10 includes a conduit or hose 12. The hose 12 has an opening or bore 14 therethrough. The hose 12 is for carrying fluids through the opening 14 therein. The hose is preferably made of a resilient and radially deformable material. The hose 12 preferably has a corrugated or undulated inner liner 13.

The assembly 10 further includes coupling means or a coupling assembly generally indicated at 16. The coupling assembly 16 is partially disposed within the conduit 12. Specifically, the coupling assembly 16 includes an insert portion 18 having a plurality of annular barbs 20 thereon. The insert portion 18 is adapted for insertion into the opening 14 of the hose 12. When the insert portion 18 is inserted into the hose 12, the annular barbs 20 engage the undulated interior surface of the hose 12. In this manner, a fluid seal is perfected to prevent fluid from flowing out of hose 12 about the coupling assembly 16. The insert portion 18 has a bore 19 therethrough for conducting fluid therethrough.

Figure 2:
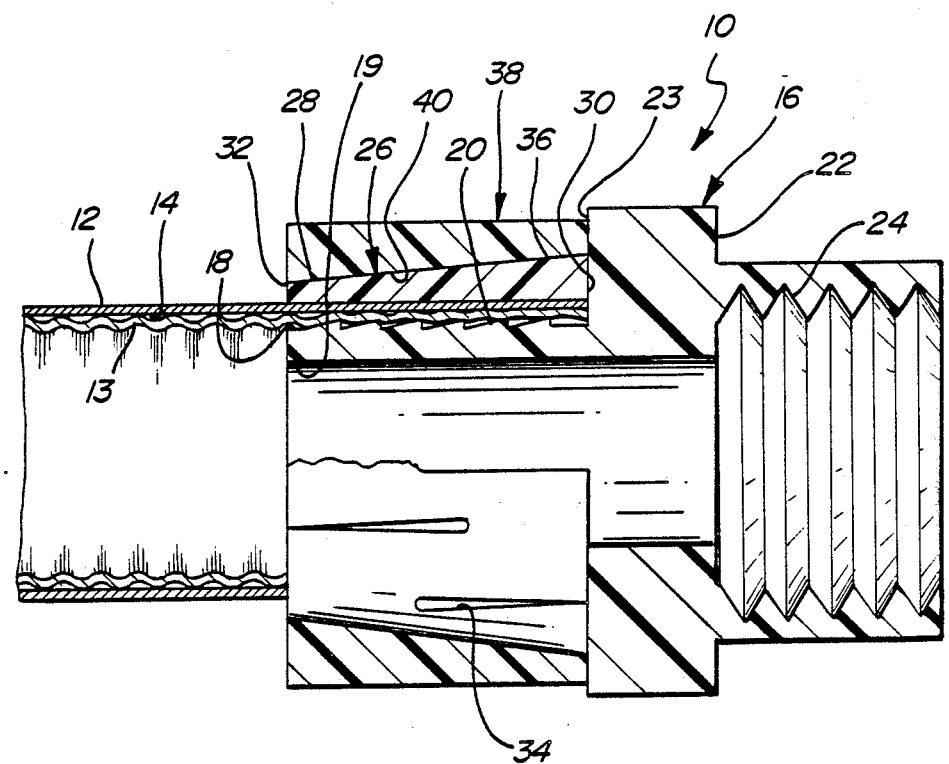
FIG. 2 is a side view partially in cross section view showing the assembly in the assembled condition.

The coupling assembly 16 further includes a connecting portion extending longitudinally outwardly from the conduit 12 and away from the insert portion 18. The connecting portion is for connecting the coupling means 16 to a mating fitting (not shown). The connecting portion includes a flanged portion 22 adapted to receive a tool, such as a wrench, to hold the coupling assembly 16 as the assembly 10 is being connected to the fitting (not shown). The flanged portion 22 defines a rear shoulder surface 23. The connecting portion further includes a threaded portion 24 extending longitudinally outwardly from the flanged portion 22. The threaded portion 24 may comprise a male threaded portion 24 as shown in FIGS. 1 and 2. Alternatively, the threaded portion may comprise a female threaded portion.

Figure 4:
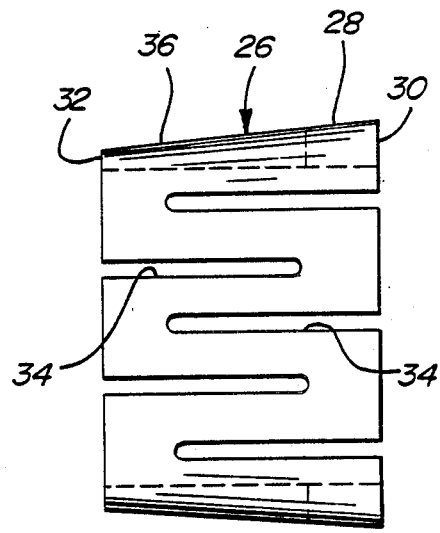
FIG. 4 is a side view of the inner collar.

The assembly 10 further includes inner collar means generally indicated at 26. The inner collar means 26 is annular and is disposed about the exterior of the hose 12. The inner collar means 26 radially compresses to cause the hose 12 to engage the barbs 20 on the insert portion 18 of the coupling means 16, as best viewed in FIG. 2. The inner collar means 26 comprises an inner tubular collar 28 (as best viewed in FIG. 4). The generally tubular inner collar 28 includes a front portion 30 and a rear portion 32. The inner tubular collar 28 has a plurality of slots 34. The slots extend alternatively and in the direction of longitudinal axis, i.e., the central axis, from the front 30 and rear 32 portions respectively of the inner collar 28. The slots 34 extend in this alternative manner circumferentially about the entire inner collar 28. Because the slots 34 extend from alternative ends of the collar 28, it produces a collar 28 having a serpentine or winding construction.

The tubular inner collar 28 has an outer inclined surface 36. The outer surface 36 is for receiving a force to radially compress the inner collar 28. When the inclined surface 36 receives the force, the slots 34 of the collar 28 compress, as best viewed in FIG. 2. In this manner, radial compression of the tubular inner collar 28 can be made circumferentially about the entire hose 12.

The assembly finally includes outer collar means generally indicated at 38. The outer collar means 38 is disposed about the exterior of the hose 12 and is for providing a radially inwardly directed force toward the conduit 12 and more specifically, to the tubular inner collar 28. The outer collar means 38 comprises an outer tubular collar 38 having an inner tapered surface 40. The inner tapered surface 40 of the outer collar 38 is for mating engagement with the outer inclined surface 36 of the inner tubular collar 38. When the outer collar 38 is moved over the inner collar 28, from the position of FIG. 1 to that of FIG. 2, the outer collar 38 which is nonmovable in a radial direction or noncompressible, provides a radially inwardly directed force to cause the slots 34 of the collar 28 to compress to provide a radial compressing force to the hose 12. This force reduces the diameter of the inner collar 28 to force the hose 12 into engagement with the barbs 20 (as best shown in FIG. 2).

Preferably, all of the coupling assembly 16, the outer collar 38 and inner collar 28 are made of an organic polymeric material. That is, each of the elements in the assembly 10 is nonmetallic.

In order to construct a hose having the subject fitting thereon, the conduit or hose 12 is first provided. The outer collar 38 and inner collar 28 are positioned about the hose 12 such that both are free to move relative to the hose 12 (FIG. 2). The insert portion 18 of the coupling assembly 16 is slid into the hose 12 until the hose 12 engages the shoulder surface 23 of the coupling assembly 16. In this position, the barbs 20 engage the interior 14 of the hose 12. The inner collar 28 is then positioned over the hose 12 such that it is radially spaced from the insert portion 18. The outer collar 38 is then slid over the inner collar 28 such that the inner tapered surface 40 of the outer collar 38 mates with the outer incline surface 36 of the inner collar 28. The outer collar provides an inwardly directed force to the inner collar 28 to cause the slots 34 to compress. This force is provided by the inner tapered surface 40 of the outer collar 38 having a smaller diameter than the initial or uncompressed diameter of the outer inclined surface 36 of the inner collar 28. Because the leading edge of the outer collar has a larger diameter than the trailing edge and the diameter is larger than the diameter of the rear portion 32 of the inner collar 28, the outer collar 38 is easily positioned over the inner collar 28. As the outer collar 38 is fully placed over the inner collar 26, it provides a radially compressive force to the inner collar 28 and causes the inner collar 28 to compress about the hose 12 to force the hose 12 into engagement with the barbs 20. This force prevents removal of the coupling assembly 16 from the hose 12. The outer collar 38 is then secured to the shoulder 23 of the flange 22 such as by welding to prevent removal of the outer collar 38 from the inner collar 28. With the connection made in this manner, constant radial compression of the inner collar 28 prevents removal of the connecting portion 16 from the hose 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A conduit coupling assembly (10) of the type connecting a conduit (12) with a fitting comprising:
   a conduit (12);
   coupling means (16) for connecting said conduit with the fitting and including an insert portion (18) having a plurality of barbs (20) thereon, said insert portion disposed within said conduit (12) and having a cylindrical bore (19) therethrough;
   an outer collar (38) disposed about said conduit (12) having an inner tapered surface (40) for providing a radially inwardly directed force toward said conduit (12); and
   annular inner collar means (26) comprising an inner tubular collar (28) including a front portion (30) and a rear portion (32) and having a plurality of slots (34) alternatively extending longitudinally from said front (30) and said rear (32) portions circumferentially about said inner tubular collar, said tubular collar (28) having a smooth inner surface for engaging said conduit (12) and an annular outer incline surface (36) for mating engagement with said inner tapered surface (40) of said outer collar (38) to receive said inwardly directed force from said outer collar (38) such that said force is applied about said outer incline surface (36) of said inner tubular collar (28) and said outer collar (38) provides radial compression circumferentially about said conduit (12) and said compression is directly applied over the axial length of said inner collar (28).

2. An assembly as set forth in claim 25 further characterized by said coupling means (16) including a connecting portion extending longitudinally outwardly from said conduit (12) and away from said insert portion (18) for connecting said coupling means (16) to the fitting.

3. An assembly as set forth in claim 2 further characterized by said connecting portion having an annular flanged portion (22) including a shoulder surface (23) to engage said inner (28) and said outer collars (38) and to limit longitudinal movement thereof.

4. An assembly as set forth in claim 3 further characterized by said connecting portion having a male threaded portion (24) extending longitudinally from said flanged portion (22).

5. An assembly as set forth in claim 3 further characterized by said connecting portion having a female threaded portion extending longitudinally from said flanged portion (22).

6. An assembly as set forth in claim 3 further characterized by said inner collar (28) and said outer collar (38) being comprising an organic polymeric material.

* * * * *